United States Patent
Hou

(10) Patent No.: US 10,569,488 B2
(45) Date of Patent: Feb. 25, 2020

(54) METHOD FOR SETTING LOOP COIL EMBEDDING DEPTH IN CONVEYOR BELT, AND METHOD FOR MANUFACTURING CONVEYOR BELT

(71) Applicant: The Yokohama Rubber Co., LTD., Minato-ku, Tokyo (JP)

(72) Inventor: Gang Hou, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 16/463,343

(22) PCT Filed: Oct. 5, 2017

(86) PCT No.: PCT/JP2017/036285
§ 371 (c)(1),
(2) Date: May 22, 2019

(87) PCT Pub. No.: WO2018/096800
PCT Pub. Date: May 31, 2018

(65) Prior Publication Data
US 2019/0351633 A1    Nov. 21, 2019

(30) Foreign Application Priority Data
Nov. 24, 2016    (JP) .................. 2016-228085

(51) Int. Cl.
*B29D 29/06*    (2006.01)
*B65G 15/36*    (2006.01)
*B29K 705/00*    (2006.01)

(52) U.S. Cl.
CPC ............. *B29D 29/06* (2013.01); *B65G 15/36* (2013.01); *B29K 2705/00* (2013.01)

(58) Field of Classification Search
CPC .................................................. B29D 29/06
See application file for complete search history.

(56) References Cited

U.S. PATENT DOCUMENTS

| 2013/0081929 | A1  | 4/2013 | Nordell et al. |
| 2015/0203299 | A1* | 7/2015 | Enshu .................... B65G 15/32 198/847 |

(Continued)

FOREIGN PATENT DOCUMENTS

| JP | 2002-228525 | 8/2002 |
| JP | 2005-075617 | 3/2005 |

(Continued)

OTHER PUBLICATIONS

International Search Report for International Application No. PCT/JP2017/036285 dated Nov. 7, 2017, 4 pages, Japan.

*Primary Examiner* — Monica A Huson
*Assistant Examiner* — Kelsey C Grace
(74) *Attorney, Agent, or Firm* — Thorpe North & Western

(57) ABSTRACT

Provided are a method for setting the embedding depth of loop coils in a conveyor belt which can enhance the durability of a loop coil without testing a large number of samples, and a method for manufacturing a conveyor belt in which the loop coil is embedded. A two-dimensional or three-dimensional FEM analysis model of an actual conveyor belt is prepared, and the appropriate embedding depth of the loop coils in the actual conveyor belt, i.e., the rubber thickness between the core layer and the loop coils is set on the basis of at least one of a principal stress or a deformation amount occurring in the loop coil in the analysis model when a falling object having predetermined specifications is dropped from above an upper cover rubber in the analysis model onto the upper cover rubber.

10 Claims, 12 Drawing Sheets

(56) References Cited

U.S. PATENT DOCUMENTS

| | | | | |
|---|---|---|---|---|
| 2015/0232276 A1* | 8/2015 | Miyajima | ............. | B65G 15/36 |
| | | | | 198/847 |
| 2018/0148263 A1* | 5/2018 | Hou | ........................ | D07B 1/06 |
| 2018/0201449 A1* | 7/2018 | Hou | ...................... | B65G 43/02 |
| 2019/0128786 A1* | 5/2019 | Hou | ...................... | G01N 3/303 |

FOREIGN PATENT DOCUMENTS

| | | |
|---|---|---|
| JP | 2014-031241 | 2/2014 |
| JP | 2015-071493 | 4/2015 |
| JP | 2016-185879 | 10/2016 |

* cited by examiner

METHOD FOR SETTING LOOP COIL EMBEDDING DEPTH IN CONVEYOR BELT, AND METHOD FOR MANUFACTURING CONVEYOR BELT

TECHNICAL FIELD

The present technology relates to a method for setting the embedding depth of loop coils in a conveyor belt which can enhance the durability of a loop coil for detecting vertical tear of a conveyor belt without testing a large number of samples, and a method for manufacturing a conveyor belt in which the loop coil is embedded.

BACKGROUND ART

In order to detect vertical tear of a conveyor belt (cracks continuous in the belt longitudinal direction), a conveyor belt in which loop coils are embedded is known (see Japan Unexamined Patent Publication Nos. 2014-31241 and 2015-71493). In such a conveyor belt, a sensor arranged adjacent to the conveyor belt senses the induced current occurring in loop coils passing near the sensor. If a sharp object or the like to be conveyed pierces the conveyor belt and a vertical tear is generated, the loop coils are damaged, so that no induced current is generated in the loop coils. In this case, the sensor does not detect the induced current even though the loop coils have passed through the vicinity. Thus, it is possible to determine whether or not vertical tear has occurred in the conveyor belt depending on whether or not the induced current is detected by the sensor. If it is determined that vertical tear has occurred on the basis of the detection of the sensor, the operation of the conveyor is stopped in order to prevent expansion of the vertical tear.

Local impacts and external forces are exerted on conveyor belts due to objects to be conveyed or the like to be loaded. Even if vertical tear does not occur in the conveyor belt due to the impact or external force, the loop coils may be damaged. If loop coils are damaged in this way, the sensors do not detect the induced current even if the loop coils passing through the vicinity. Thus, if judged based on the detection of the sensor, it will be erroneously recognized that vertical tears occur in the conveyor belt.

As a result of analyzes and tests of the inventors of the present application, it was found that there is a high correlation between the position of the embedding depth of loop coils in the lower cover rubber and the damage state of the loop coils. However, manufacturing many samples in which the position of embedding depth of the loop coils in lower cover rubber is made different and applying an impact to these samples in order to confirm the damage conditions of the loop coils, a great deal of man-hours (time and cost) are required.

SUMMARY

The present technology provides a method for setting the embedding depth of loop coils in a conveyor belt which can enhance the durability of the loop coils for detecting vertical tear of the conveyor belt without testing with numerous samples, and a method for manufacturing a conveyor belt in which the loop coils are embedded.

A method for setting the embedding depth of loop coils in a conveyor belt according to the present technology is a method for setting the embedding depth of loop coils in a conveyor belt. The conveyor belt is provided with a core layer formed by arranging a plurality of metal cords extending in the belt longitudinal direction in parallel with each other in the belt width direction, and an upper cover rubber and a lower cover rubber arranged above and below the core layer, and a plurality of loop coils embedded in the lower cover rubber at intervals in the longitudinal direction of the belt. The method comprises the steps of preparing a two-dimensional or three-dimensional FEM analysis model of the conveyor belt, and setting the embedding depth of the loop coils in the conveyor belt on the basis of at least one of a principal stress or a deformation amount occurring in the loop coils in this analysis model when a falling object having predetermined specifications is dropped from above the upper cover rubber in the analysis model to the upper cover rubber.

In a method for manufacturing a conveyor belt according to the present technology, a unvulcanized molded body of the conveyor belt in which the loop coils are embedded at an embedding depth position set by the method for setting the embedding depth of loop coils, and manufacturing the conveyor belt by vulcanizing the molded body.

According to the method for setting the embedding depth of loop coils according to the present technology, it is possible by using two-dimensional or three-dimensional FEM (Finite Element Method) analysis model of an actual conveyor belt to reproduce the conditions upon a local impact or an external force acts on the loop coils an actual conveyor belt due to an object to be conveyed being loaded from above the upper cover rubber toward the upper cover rubber. On the basis of at least one of the principal stress or the deformation amount occurring in the loop coil in this analysis model, it is possible to grasp the appropriate embedding position of loop coils at which the principal stress or the deformation amount occurring in the loop coils in the actual conveyor belt becomes small. Thus, it is possible to set an appropriate embedding depth in an actual conveyor belt at which the durability of a loop coil can be enhanced without performing a test using a large number of samples.

In addition, according to the method for manufacturing a conveyor belt of the present technology, it is possible to manufacture a conveyor belt having loop coils embedded at an appropriate embedding position set by the above setting method. Consequently, it is easy to prevent damage to the loop coils due to impacts or external forces due to objects to be conveyed being loaded to the upper cover rubber. Accordingly, even if vertical tear does not occur in the conveyor belt, it is advantageous for avoiding misidentification that the loop coils are damaged.

DETAILED DESCRIPTION

A setting method for the embedding depth of loop coils in a conveyor belt (hereinafter, referred to as a setting method) and a manufacturing method for a conveyor belt according to embodiments of the present technology will be described below with reference to the drawings.

Figure 1:
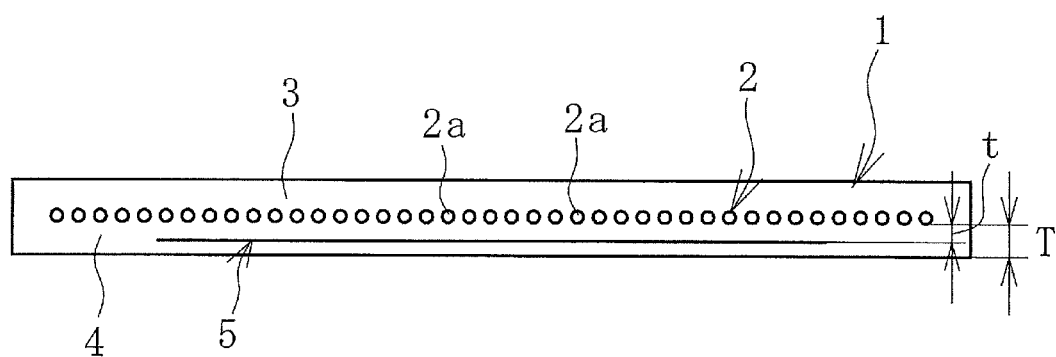
FIG. 1 is a cross-sectional view illustrating a conveyor belt manufactured by a manufacturing method according to an embodiment of the present technology.
Figure 2:
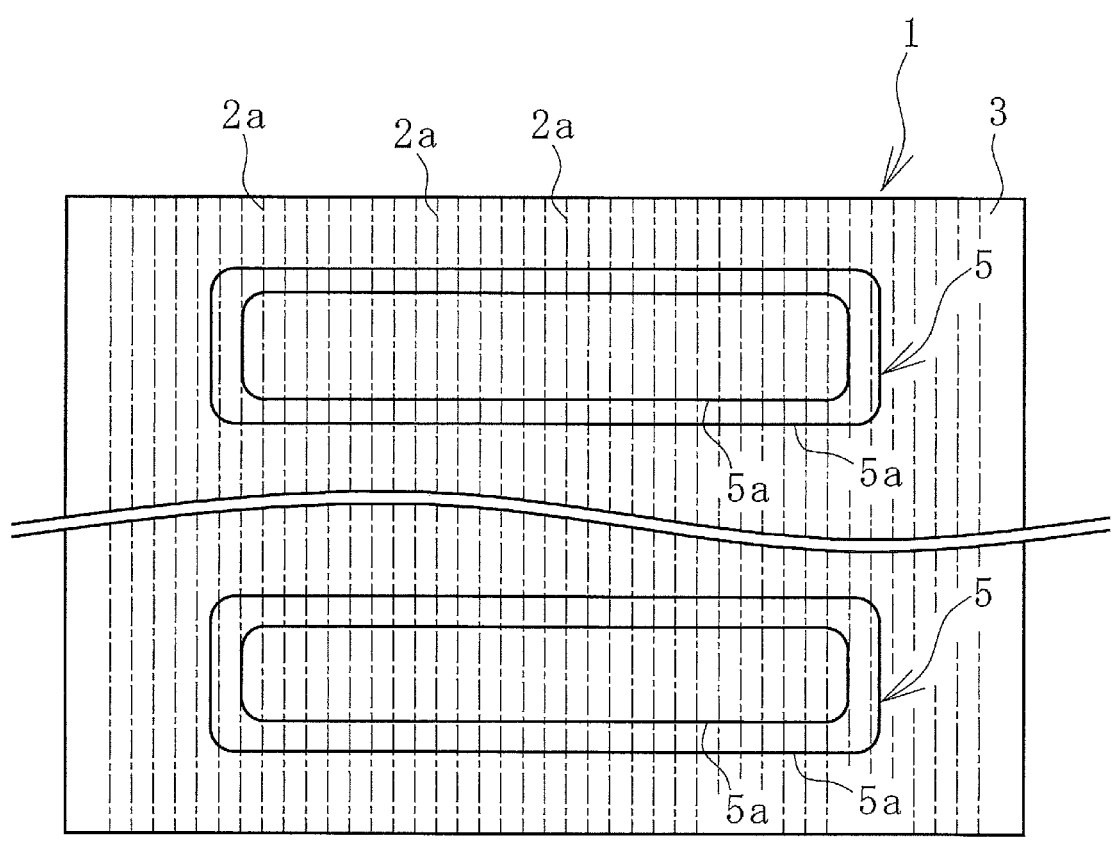
FIG. 2 is an explanatory diagram illustrating the internal structure of the conveyor belt of FIG. 1 in a plan view.

A conveyor belt 1 manufactured by the manufacturing method for a conveyor belt according to the present technology is illustrated in FIGS. 1 and 2 is provided with a core layer 2, and an upper cover rubber 3 and a lower cover rubber 4 disposed above and below the core layer 2, which are integrated with one another via vulcanization process. The conveyor belt 1 may also include edge rubber disposed on each end portion in the belt width direction or other constituents as appropriate.

In the core layer 2, a plurality of metal cords 2a (steel cords, for example) extending in the belt longitudinal direction are arranged in parallel with each other in the belt width direction. Specifically, the core layer 2 is covered with a cushion rubber, and the cushion rubber is bonded to the upper cover rubber 3 and the lower cover rubber 4 via vulcanization bonding. Furthermore, in FIG. 2, in order to facilitate understanding of the internal structure of the conveyor belt 1, the metal cords 2a are indicated by dot-dash lines at its center position.

For the upper cover rubber 3 and the lower cover rubber 4, a rubber composition may be used that contains at least a diene rubber including natural rubber, and carbon black to achieve good wear resistance. The layer thicknesses of the upper cover rubber 3 and the lower cover rubber 4 are determined as appropriate according to the performance required of the conveyor belt 1, within a range of, for example, from 5 mm to 30 mm. The cushion rubber is a rubber with excellent adhesion.

A plurality of loop coils 5 are embedded in the lower cover rubber 4 at intervals in the belt longitudinal direction. The loop coils 5 are, for example, a conductive wire 5a formed in an annular shape, and a known one may be used. The conductive wire 5a may be formed into a wavy shape or a non-wavy shape. The loop coils 5 is not limited to a double quadrilateral shape, and various shapes such as a circular shape and an elliptical shape may be adopted. The loop coil 5 embedded position in plane is within a region including the central portion in the belt width direction.

Figure 3:
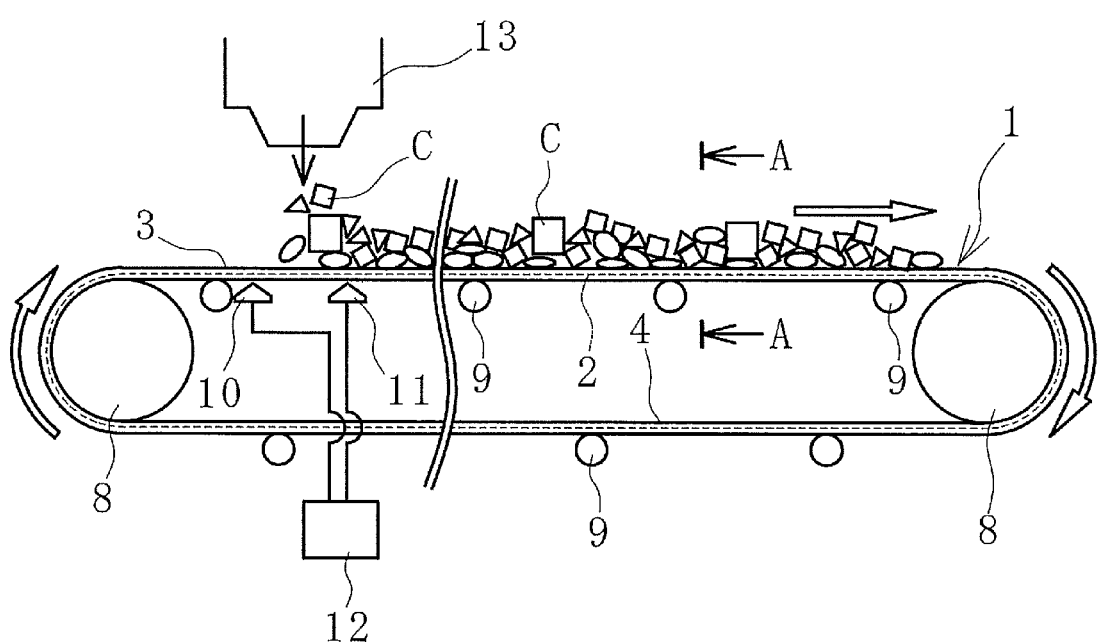
FIG. 3 is an explanatory diagram illustrating a belt conveyor system having the conveyor belt of FIG. 1 installed in a side view.
Figure 4:
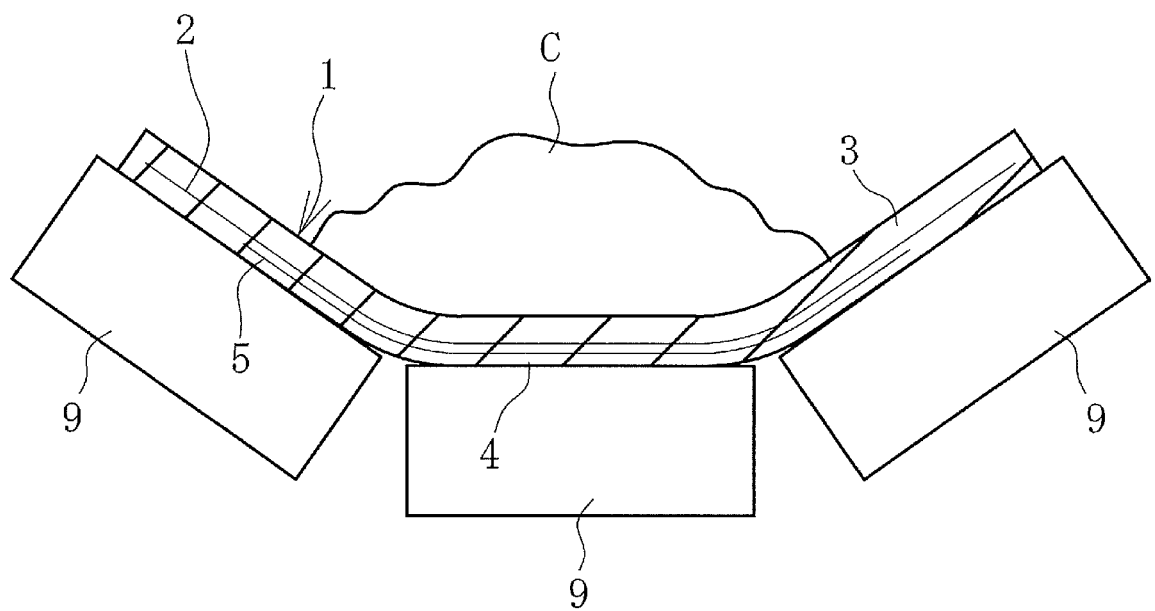
FIG. 4 is a cross-sectional view taken along A-A of FIG. 3.

The belt conveyor system 7 illustrated in FIG. 3 is provided with the conveyor belt 1, a magnetic field generating unit 10, and a sensor 11. The conveyor belt 1 is stretched between pulleys 8,8, and objects to be conveyed C are loaded to the upper cover rubber 3 through a chute part 13. As illustrated in FIG. 4, the conveyor belt 1 is supported on the carrier side in a trough shape projecting downward by support rollers 9, so that the loaded objects to be conveyed C are placed mainly at the center in the belt width direction.

The magnetic field generating unit 10 is disposed adjacent to the lower cover rubber 4. The magnetic field generating unit 10 transmits, for example, an electromagnetic wave to each of the loop coils 5 passing near the magnetic field generating unit 10. An induced current is induced in each of the loop coils 5 due to this electromagnetic wave. If the loop coils 5 are disconnected, no induced current is induced.

The sensor 11 is disposed adjacent to the lower cover rubber 4. The sensor 11 is arranged slightly downstream of the magnetic field generating unit 10 in the forward direction of the conveyor belt 1. The sensor 11 detects whether or not any induced current is generated for each of the loop coils 5 passing near the sensor 11. Detection data from the sensor 11 is transmitted to a control unit 12. On the basis of the detection data from the sensor 11, the control unit 12 determines that vertical tear has not occurred in the conveyor belt 1 if induced current is generated, and if no induced current is not generated, determines that vertical tear has occurred in the conveyor belt 1. If it is determined that vertical tear occurs in the conveyor belt 1, the operation of the conveyor belt 1 is stopped, and a warning or the like is issued.

An impact or an external force from objects to be conveyed C loaded to the upper cover rubber 3 acts on the conveyor belt 1, which may cause the loop coils 5 to be damaged. Therefore, according to the setting method of the present technology, an appropriate embedding position is set so that the loop coils 5 are not easily damaged even when such impact or external force acts. Specifically, an appropriate vertical interval (rubber thickness t) between the core layer 2 and loop coils 5 illustrated in FIG. 1 is set. This rubber thickness t is the vertical interval between the lower surface of the core layer 2 and the upper surface of the loop coils 5.

Figure 5:
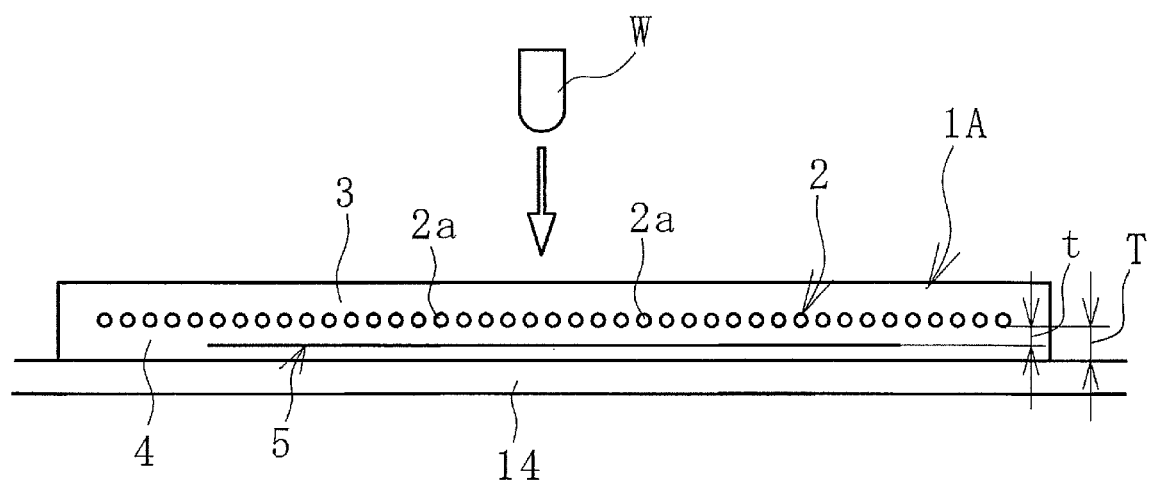
FIG. 5 is an explanatory diagram illustrating an analysis model of a conveyor belt used for the method for setting the embedding depth of loop coils according to the present technology in a cross-sectional view.

As illustrated in FIG. 5, in the setting method of the present technology, a two-dimensional or three-dimensional FEM analysis model 1A of an actual conveyor belt 1 is used. This analysis model 1A is provided with the same constituent elements as the actual conveyor belt 1. In the drawings, each of the constituent elements of the analysis model 1A is labeled with the same references as the constituent elements of the actual conveyor belt 1. In the analysis model 1A, material property values required for FEM analysis (Young's modulus, Poisson's ratio, etc.) are set for each constituent element, and then input into an arithmetic unit that performs analysis.

In the prepared analysis model 1A, the arithmetic device calculates at least one of the principal stress or the deformation amount, or a change amount corresponding to at least one of the principal stress or the deformation amount, occurring in the loop coils 5 when dropping a falling object W having predetermined specifications from above the upper cover rubber 3 onto the upper cover rubber 3. For example, vertical direction stress and deformation amount occurring in the loop coils 5 are calculated by FEM analysis. The specifications and falling height of the falling object W are determined as appropriate on the basis of the usage conditions (shape and weight of object to be conveyed C) of the actual conveyor belt 1.

According to the present embodiment, the analysis model 1A is placed horizontally on a flat rigid body 14 such as a steel sheet. Although the analysis model 1A may be supported at intervals by support rollers 9 in the belt longitudinal direction as in the actual belt conveyor system 7, by placing the entire analysis model 1A on a rigid body 14, it becomes a severe condition for the loop coils 5 likely to result in damage, so a more appropriate embedding depth position can be set.

Figure 6:
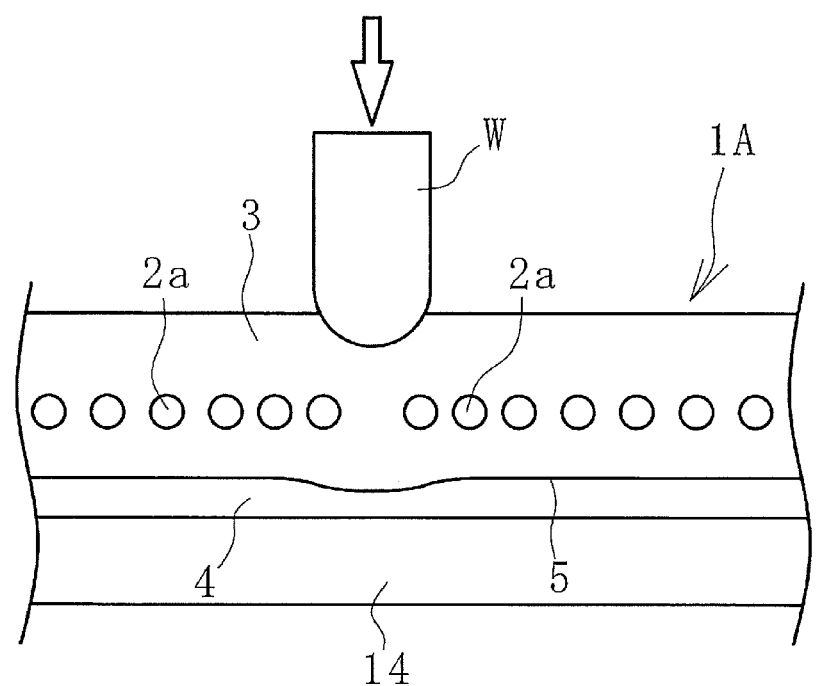
FIG. 6 is an explanatory diagram schematically illustrating a state in which the analysis model of FIG. 5 receives an impact from the upper cover rubber side.

In the analysis model 1A, when the falling object W is caused to fall freely as illustrated in FIG. 6, the upper cover rubber 3 and loop coils 5 are locally distorted downward and deform within the area corresponding to the falling point of falling object W, and the metal cords 2a are displaced in the belt width direction. The maximum stress and the maximum deformation amount occurring in the loop coils 5 at this time are calculated. This analysis is performed by varying the embedding depth position of the loop coils 5 (rubber thickness t). As a result, the relationship between the respective embedding depth positions and the maximum stress or the maximum deformation amount is ascertained, as is the range within which the maximum stress or the maximum deformation amount is minimized, and this range is set as the appropriate embedding depth position of the loop coils 5 in the actual conveyor belt 1.

Figure 7:
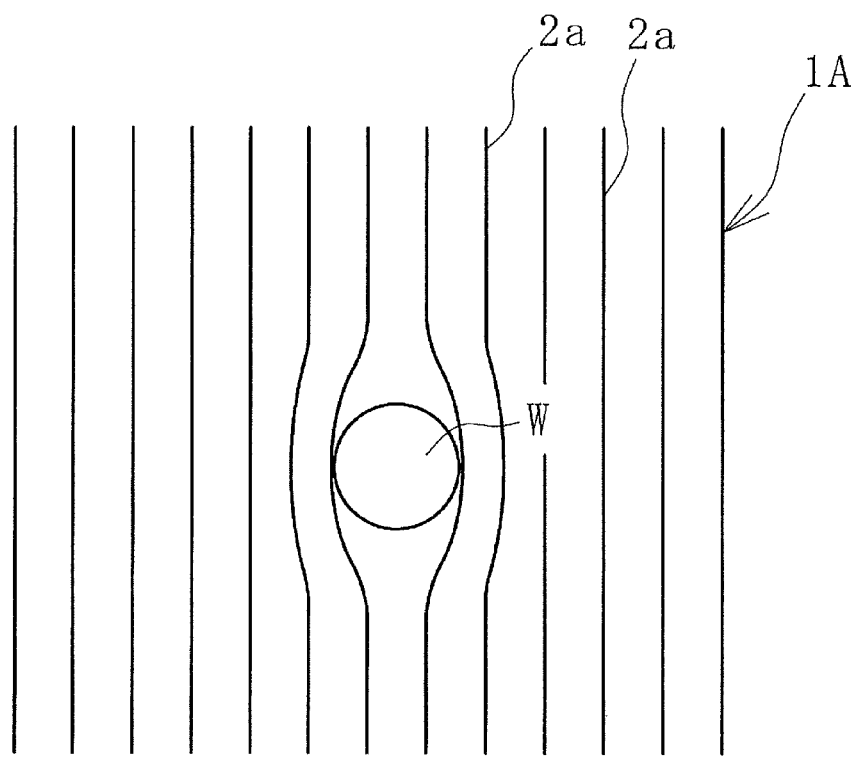
FIG. 7 is an explanatory diagram schematically illustrating the analysis model of FIG. 6 in a plan view seen from the upper cover rubber side.

As illustrated in FIG. 6 and FIG. 7, when an impact or an external force acts upon the analysis model 1A, the metal cords 2a arranged in parallel are joined by cushion rubber interposed in mutual clearance, but the cushion rubber elastically deforms. Therefore, since the force constraining the displacement of the metal cords 2a in the belt width direction is weak, the metal cords 2a are locally displaced in the belt width direction, and the interval between the metal cords 2a in the belt width direction increases. The displacement amount of the metal cords 2a in the belt width direction correlates with the maximum stress and maximum deformation amount occurring in the loop coils 5. Therefore, by accumulating correlation data between the displacement amount of the metal cords 2a in the belt width direction and the maximum stress or the maximum deformation amount occurring in the loop coils 5, it is possible to set the appropriate embedding depth position of the loop coils 5 on the basis of the displacement amount of the metal cords 2a in the belt width direction. Namely, in the present technology, as the change amount corresponding to at least one of the principal stress or the deformation amount occurring in the loop coils 5 as described above, an appropriate embedding depth position of the loop coils 5 may be set using the displacement amount of the metal cords 2a in the belt width direction.

Thus, according to the setting method of the present technology, an appropriate embedding depth at which the durability of the loop coils 5 can be enhanced in the actual conveyor belt 1 can be set without manufacturing and testing a large number of samples. Since it is possible to ascertain the appropriate embedding depth position of the loop coils 5 in the conveyor belt 1 according to its specifications (type of rubber, type of metal cords, etc.) in the development stage of the conveyor belt 1, it is extremely advantageous.

The analysis model 1A may be three-dimensional or two-dimensional, but making the model two-dimensional greatly shortens the time required for model preparation. If the correlation between the displacement amount of the metal cords 2a in the belt width direction and the maximum stress or the maximum deformation amount occurring in the loop coils 5 can be sufficiently ascertained, then the appropriate embedding depth position of the loop coils 5 can be set with high accuracy with the two-dimensional analysis model 1A.

Figure 8:
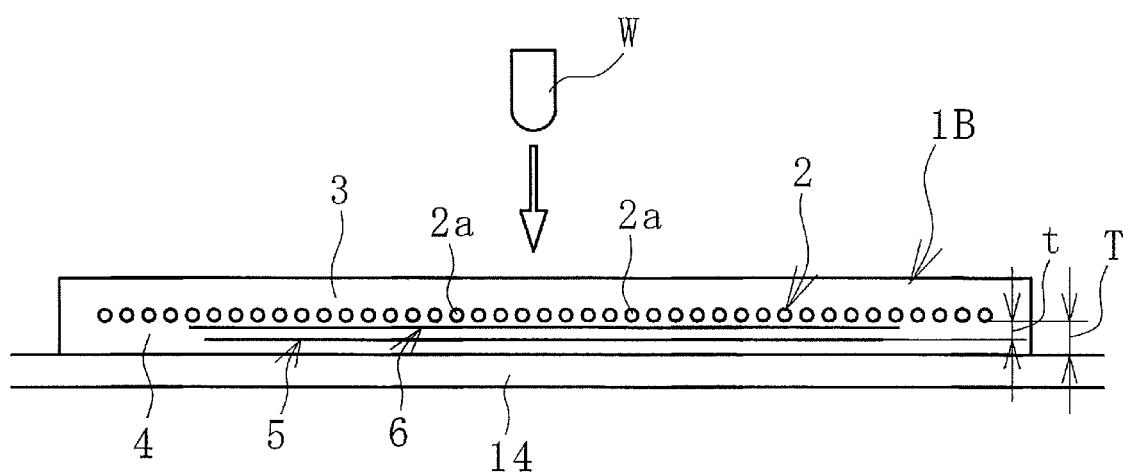
FIG. 8 is a cross-sectional view illustrating another analysis model.
Figure 9:
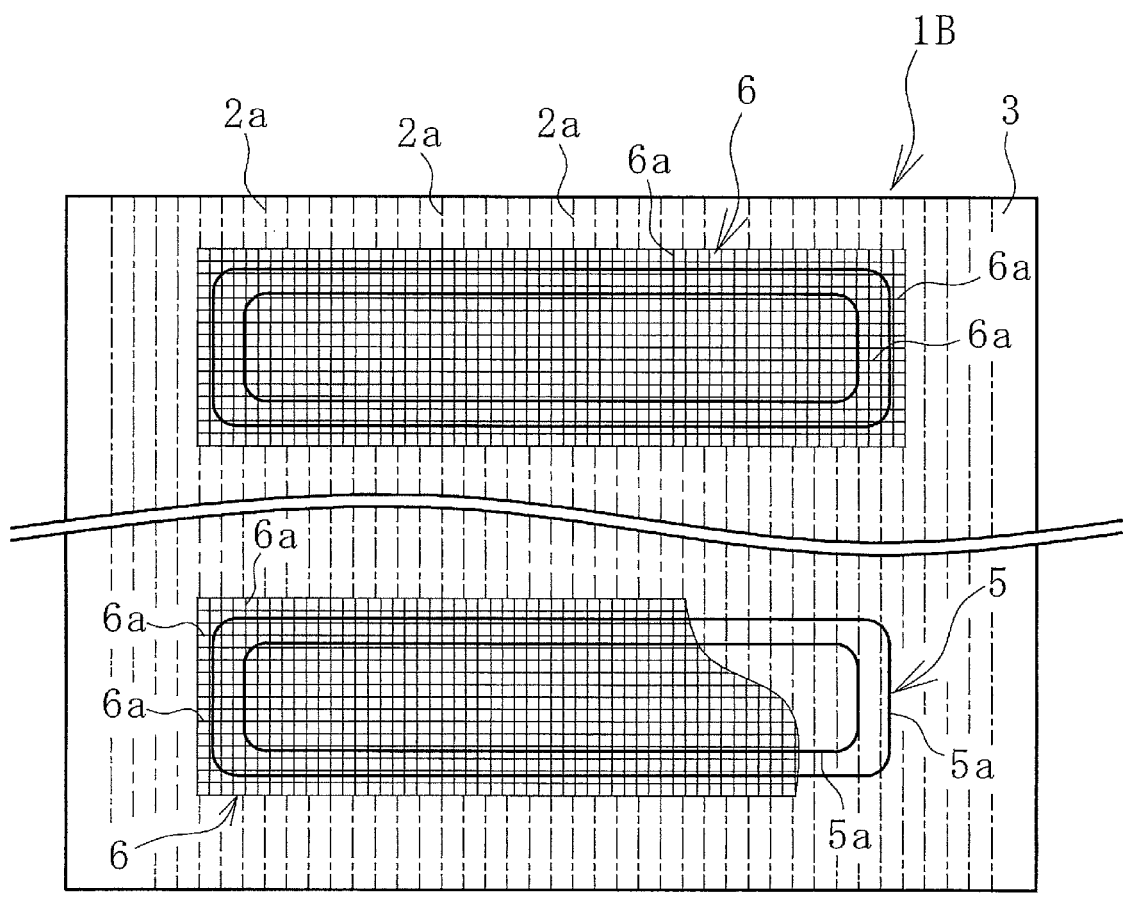
FIG. 9 is an explanatory diagram illustrating the internal structure of the analysis model of FIG. 8 in a plan view.

Another analysis model 1B illustrated in FIG. 8 and FIG. 9 may be used. In this analysis model 1B, in the above-described analysis model 1A, protective layers 6 are embedded in the lower cover rubber 4 at a predetermined vertical depth between the core layer 2 and the loop coils 5. Namely, the protective layers 6 are embedded in the lower cover rubber 4 at intervals in the belt longitudinal direction. The protective layers 6 have a smaller elongation (higher modulus) than the rubber used for the conveyor belt 1 under the same conditions. In the actual conveyor belt 1, the protective layers 6 having a thickness of, for example, from 0.2 mm to 3.0 mm is used.

The protective layers 6 are disposed covering the entire range of the corresponding loop coils 5 (the loop coils 5 disposed nearest to the protective layer 6) in a plan view when seen from the upper cover rubber 3 side. In FIG. 9, in order to facilitate understanding of the internal structure of the analysis model 1B, the metal cords 2a are indicated by dot-dash lines at its center position, and are omitted in the areas corresponding to the protective layers 6. In addition, in FIG. 9, the lower protective layer 6 is partially cut away.

In the actual conveyor belt 1, the protective layers 6 can be formed of various materials such as natural rubbers, resins, metals and the like. Various structures such as a woven structure and a film shape can be adopted for the protective layers 6. As the woven structure, a plain weave structure, a cord weave structure, a twill weave structure, a sateen weave structure or the like can be exemplified.

In this analysis model 1B, the protective layers 6 are formed by a plurality of wires 6a. As the wires 6a, a desired wires 6a such as natural fibers, resin fibers metal fibers or the like can be used. The protective layers 6 have a plain weave structure, and thus a plurality of wires 6a extending in the belt width direction are disposed in parallel in the belt longitudinal direction. Thus, the wires 6a extending in the belt width direction intersect with the metal cords 2a disposed in parallel in the belt width direction.

Figure 10:
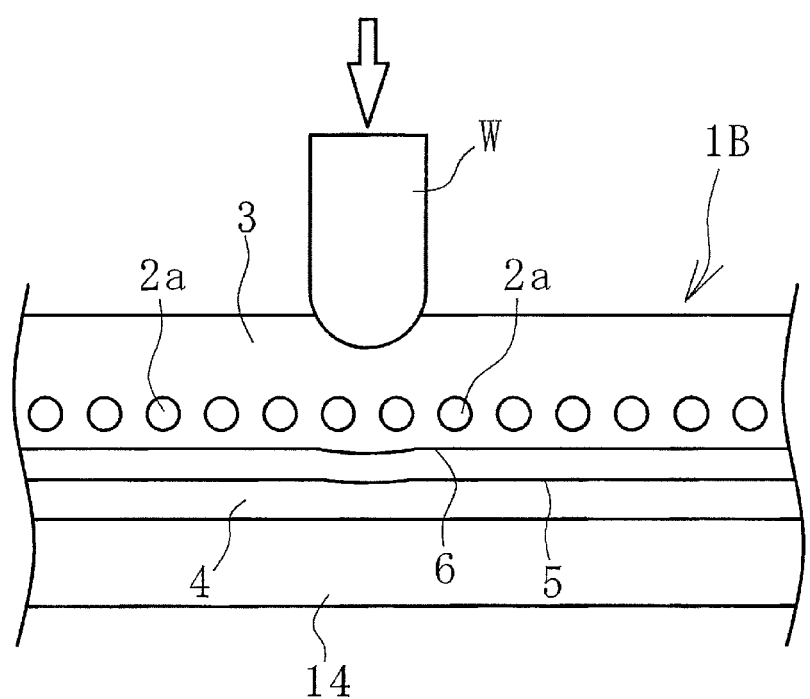
FIG. 10 is an explanatory diagram schematically illustrating a state in which the analysis model of FIG. 8 receives an impact from the upper cover rubber side in a cross-sectional view.

When the falling object W is caused to fall freely as illustrated in FIG. 10, the upper cover rubber 3 and loop coils 5 are locally distorted somewhat downward and deform within the area corresponding to the falling point of the falling object W, but the metal cords 2a are hardly displaced in the belt width direction. The maximum stress and the maximum deformation amount occurring in the loop coils 5 at this time are calculated. This analysis is performed by varying the embedding depth position of the loop coils 5 (rubber thickness t). As a result, the relationship between the respective embedding depth positions and the maximum stress or the maximum deformation amount is ascertained, as is the range within which the maximum stress or the maximum deformation amount is minimized, and this range is set as the appropriate embedding depth position of the loop coils 5 in the actual conveyor belt 1.

Figure 11:
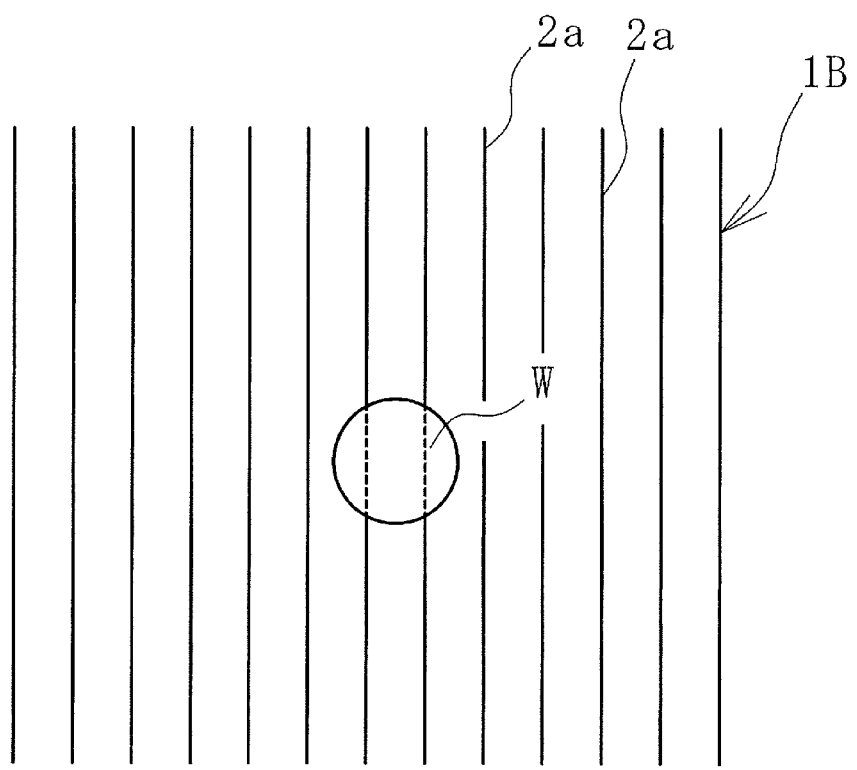
FIG. 11 is an explanatory diagram schematically illustrating the analysis model of FIG. 10 in a plan view seen from the upper cover rubber side.

In this analysis model 1B, since the protective layers 6 are arranged so as to cover the metal cords 2a disposed in parallel, the protective layers 6 exerts a function of bundling metal cords 2a adjacent to each other in the belt width direction. Thus, when an impact or an external force acts on the analysis model 1B as illustrated in FIG. 10 and FIG. 11, the displacement of the metal cords 2a in the belt width direction is suppressed as compared with analysis model 1A.

Also in this analysis model 1B, various conditions and modifications applied to the previous analysis model 1A may be performed.

Figure 12:
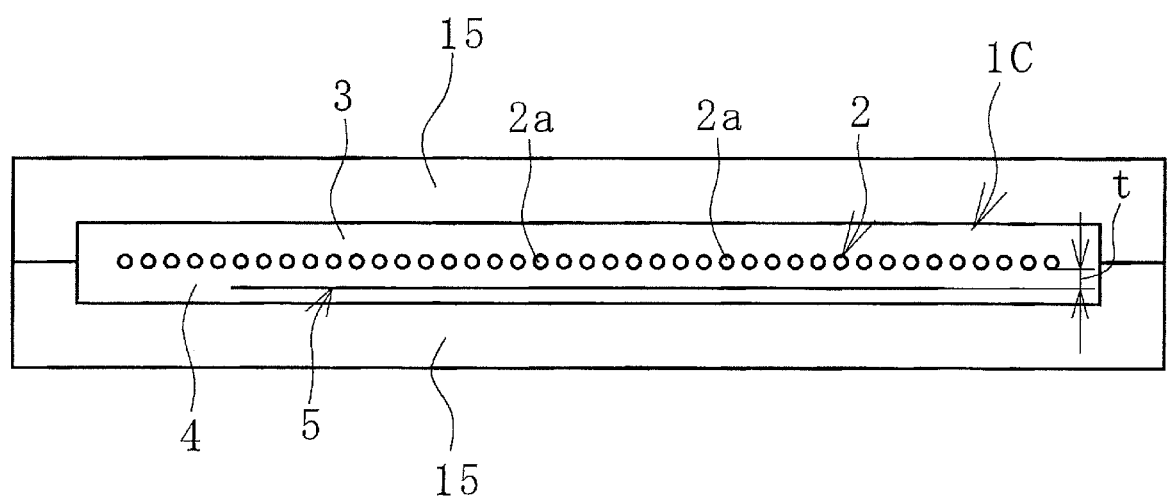
FIG. 12 is an explanatory diagram illustrating a state in which a molded body is vulcanized in a cross-sectional view.

According to the method for manufacturing a conveyor belt of the present technology, as illustrated in FIG. 12, a molded body 1C of an unvulcanized conveyor belt in which the loop coils 5 are embedded at an appropriate embedded depth position set using the above analysis model 1A is molded. Subsequently, the molded body 1C is placed in the molds 15 and 15 and vulcanized to manufacture the conveyor belt 1.

According to another method for manufacturing a conveyor belt of the present technology, the loop coils 5 are embedded at an appropriate embedding position set using the above analysis model 1B, and then a molded body 1C of an unvulcanized conveyor belt in which a protective layer 6 is embedded in the lower cover rubber 4 at a predetermined vertical depth between the core layer 2 and loop coils 5 is molded. Subsequently, the molded body 1C is placed in the molds 15 and 15 and vulcanized to manufacture the conveyor belt 1.

In the conveyor belt 1 thus manufactured, the loop coils 5 are embedded at an appropriate embedding position set using analysis models 1A and 1B. Thus, it is easy to prevent damage to loop coils 5 caused by impacts and external forces caused by the objects to be conveyed C loaded to the upper cover rubber 3. Accordingly, even if vertical tear does not occur on the conveyor belt 1, it is advantageous for avoiding mistaken recognition that the loop coils 5 are damaged.

In particular, if the specifications are such that the protective layers 6 are provided on the actual conveyor belt 1 as in the analysis model 1B, even if a local impact or an external force is act due to the objects to be conveyed C or the like, the displacement of the metal cords 2a in the belt width direction is suppressed. Thereby, the impact and the external force acting are widely dispersed among the metal cords 2a. In addition, the impact and the external force are absorbed or lessened by the protective layers 6. Thus, even if a large impact or an external force acts locally on the conveyor belt 1, the loop coils 5 are not easily damaged, and its durability is further enhanced. Therefore, it is more advantageous to avoid the situations that the loop coils 5 are damaged even if vertical tear does not occur in the conveyor belt 1, and it is possible to detect vertical tear in the conveyor belt 1 more accurately.

Additionally, since the respective protective layers 6 re embedded in the lower cover rubber 4 at intervals in the belt longitudinal direction, the weight increase of the conveyor belt 1 due to the provision of the protective layers 6 can be suppressed, and it is also possible to avoid deterioration of flexibility. These facts greatly affect reducing the energy required for operating the conveyor belt 1, which contributes to energy saving.

In order to satisfy the specification in which the protective layers 6 are embedded in the lower cover rubber 4 at intervals in the belt longitudinal direction, the respective loop coils 5 may be disposed together with the respective protective layers 6 in the lower cover rubber 4 in the forming process for the conveyor belt 1. Thus, it is unnecessary to substantially increase the number of steps in manufacturing according to this specification as compared with the case of the specification not embedding the protective layers 6.

EXAMPLES

It was found that when the appropriate embedding depth position of the loop coils 5 is calculated using the analysis model 1A illustrated in FIG. 5, the loop coils 5 are moved to the position from 30% to 80% of the rubber thickness T of the lower cover rubber 4 from the lower surface of the core layer 2 (30% to 80% of the rubber thickness t=T), and more preferably from 50% to 60%. In addition, it was found that the vertical interval between the core layer 2 and loop coils 5 (rubber thickness t) may be 5 mm or more.

In addition, the appropriate embedding depth position of loop coils 5 calculated using the analysis model 1B under the same conditions as the analysis model 1A was approximately the same as the analysis model 1A. At this time, a plain weave structure consisting of nylon fibers was used for the protective layers. However, it was found that in the analysis model 1B, the principal stress and deformation amount occurring in the loop coils 5 were about 60% of that in the analysis model 1A.

The invention claimed is:

1. A method for setting the embedding depth of loop coils in a conveyor belt, the conveyor belt comprising: a core layer formed by arranging a plurality of metal cords extending in a belt longitudinal direction in parallel with each other in a belt width direction; an upper cover rubber and a lower cover rubber arranged above and below the core layer; and a plurality of loop coils embedded in the lower cover rubber at intervals in the longitudinal direction of the belt, the method comprising the steps of:

preparing a two-dimensional or three-dimensional FEM analysis model of the conveyor belt; and setting the embedding depth of the loop coils in the conveyor belt on the basis of at least one of a principal stress or a deformation amount occurring in the loop coils in the analysis model when a falling object having predetermined specifications is dropped from above the upper cover rubber in the analysis model to the upper cover rubber.

2. The method for setting the embedding depth of loop coils in a conveyor belt according to claim 1, wherein the falling object is dropped under conditions that the analysis model is placed on a rigid body.

3. The method for setting the embedding depth of loop coils in a conveyor belt according to claim 1, wherein the embedding depth of the loop coils are set by using a displacement amount of metal cords in the belt width direction in the analysis model corresponding to the principal stress or the deformation amount.

4. The method for setting the embedding depth of loops coils in a conveyor belt according to claim 1, wherein a model in which protective layers are embedded in a lower core rubber at a predetermined depth between the core layer and loop coils is used as the analysis model.

5. A manufacturing method for a conveyor belt, comprising the steps of: molding the unvulcanized molded body of a conveyor belt in which loop coils are embedded at an embedding depth position set by the method for setting the embedding depth of loop coils according to claim 1; and manufacturing the conveyor belt by vulcanizing the molded body.

6. A manufacturing method for a conveyor belt, comprising the steps of: embedding loop coils at an embedding depth set by the method for setting the embedding depth of loop coils according to claim 4; molding the unvulcanized molded body of a conveyor belt in which the protective layers are embedded in the lower cover rubber at a predetermined depth between the core layer and loop coils, and manufacturing a conveyor belt by vulcanizing the molded body.

7. The method for setting the embedding depth of loop coils in a conveyor belt according to claim 2, wherein the embedding depth of the loop coils are set by using a displacement amount of metal cords in the belt width direction in the analysis model corresponding to the principal stress or the deformation amount.

8. The method for setting the embedding depth of loops coils in a conveyor belt according to claim 7, wherein a model in which protective layers are embedded in a lower core rubber at a predetermined depth between the core layer and loop coils is used as the analysis model.

9. A manufacturing method for a conveyor belt, comprising the steps of: molding the unvulcanized molded body of a conveyor belt in which loop coils are embedded at an embedding depth position set by the method for setting the embedding depth of loop coils according to claim 8; and manufacturing the conveyor belt by vulcanizing the molded body.

10. A manufacturing method for a conveyor belt, comprising the steps of: embedding loop coils at an embedding depth set by the method for setting the embedding depth of loop coils according to claim 8; molding the unvulcanized molded body of a conveyor belt in which the protective layers are embedded in the lower cover rubber at a predetermined depth between the core layer and loop coils, and manufacturing a conveyor belt by vulcanizing the molded body.

\* \* \* \* \*